(12) United States Patent
Mancini et al.

(10) Patent No.: US 11,339,847 B2
(45) Date of Patent: May 24, 2022

(54) SYSTEMS AND METHODS FOR ADDITIVE MANUFACTURING TO ENCAPSULATE TRANSFORMATIVE COLLOIDAL SUSPENSIONS

(71) Applicants: Lawrence Livermore National Security, LLC, Livermore, CA (US); The Regents of the University of California, Oakland, CA (US)

(72) Inventors: Julie A. Mancini, Livermore, CA (US); Eric B. Duoss, Danville, CA (US); Alexandra Golobic, Oakland, CA (US); Mark Christian Messner, Tracy, CA (US); Christopher M. Spadaccini, Oakland, CA (US); Kenneth J. Loh, San Diego, CA (US)

(73) Assignees: Lawrence Livermore National Security, LLC, Livermore, CA (US); The Regents of the University Of California, Oakland, CA (US)

( * ) Notice: Subject to any disclaimer, the term of this patent is extended or adjusted under 35 U.S.C. 154(b) by 0 days.

(21) Appl. No.: 16/850,701

(22) Filed: Apr. 16, 2020

(65) Prior Publication Data
US 2020/0238681 A1 Jul. 30, 2020

Related U.S. Application Data

(62) Division of application No. 15/239,306, filed on Aug. 17, 2016, now Pat. No. 10,661,549.

(51) Int. Cl.
*B29C 64/00* (2017.01)
*F16F 9/53* (2006.01)
*B33Y 10/00* (2015.01)
*B29C 64/112* (2017.01)
*B29L 9/00* (2006.01)

(52) U.S. Cl.
CPC ............ *F16F 9/535* (2013.01); *B29C 64/112* (2017.08); *B33Y 10/00* (2014.12); *F16F 9/532* (2013.01); *B29K 2995/0008* (2013.01); *B29L 2009/00* (2013.01); *F16F 2226/04* (2013.01)

(58) Field of Classification Search
CPC . B33Y 10/00; F16F 9/532; F16F 9/535; F16F 2226/04; B29C 64/112; B29K 2995/0008; B29L 2009/00
See application file for complete search history.

(56) References Cited

U.S. PATENT DOCUMENTS

2016/0145968 A1 5/2016 Marya

OTHER PUBLICATIONS

Lorang, D. J., Tanaka, D., Spadaccini, C. M., Rose, K. A., Cherepy, N. J., & Lewis, J. A. (2011). Photocurable Liquid Core-Fugitive Shell Printing of Optical Waveguides. Advanced Materials, 23(43), 5055-5058. http://doi.org/10.1002/adma.201102411.
(Continued)

*Primary Examiner* — Robert J Grun
(74) *Attorney, Agent, or Firm* — Harness, Dickey & Pierce, P.L.C.

(57) ABSTRACT

The present disclosure relates to an energy absorbing three dimensional (3D) structure. The structure may have an outer shell formed from a shell material. The outer shell may have a void forming a core volume. A transformative feedstock is contained in the void. The transformative feedstock is encapsulated within the outer shell, within the void, and provides enhanced energy absorbing properties to the 3D structure.

22 Claims, 4 Drawing Sheets

(56) References Cited

OTHER PUBLICATIONS

Leonowicz, M., & Kozlowska, J. (2014). Rheological Fluids as a Potential Component of Textile Products. Fibres Textiles in Eastern Europe, 1(103), 28-33.

Krueger, H., Vaezi, M., & Yang, S. (2014). 3D Printing of Magnetorheological Elastomers (MREs) Smart Materials (pp. 213-218). Presented at the 1st International Conference on Progress in Additive Manufacturing, Singapore: Research Publishing Services. http://doi.org/10.3850/978-981-09-0446-3_088.

Deshmukh, S. S., & McKinley, G. H. (2006). Adaptive energy-absorbing materials using field-responsive fluid-impregnated cellular solids. Smart Materials and Structures, 16(1), 106-113. http://doi.org/10.1088/0964-1726/16/1/013.

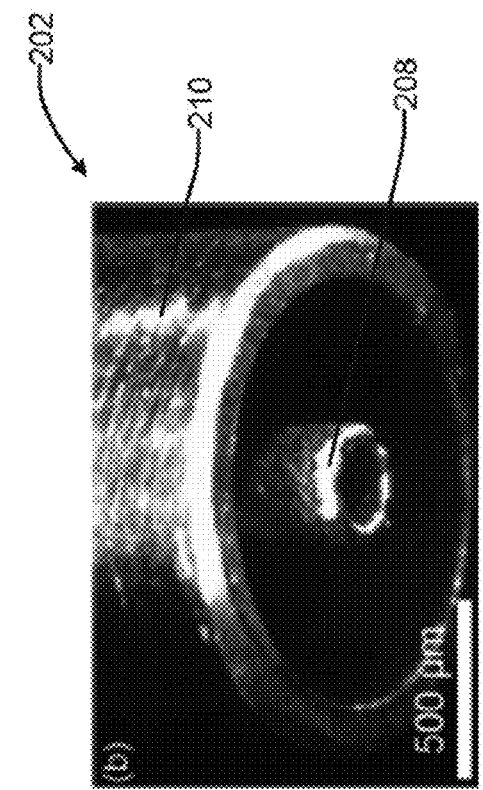
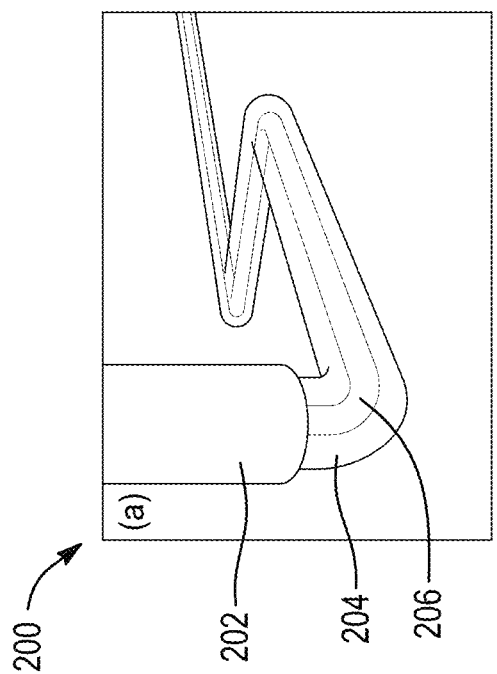
FIGURE 2A
FIGURE 2B

SYSTEMS AND METHODS FOR ADDITIVE MANUFACTURING TO ENCAPSULATE TRANSFORMATIVE COLLOIDAL SUSPENSIONS

CROSS-REFERENCE TO RELATED APPLICATIONS

This application is a divisional and claims priority of U.S. patent application Ser. No. 15/239,306 filed on Aug. 17, 2016 (now Allowed). The entire disclosure of the above application is incorporated herein by reference.

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to systems and method for additive manufacturing, and more particularly to systems and methods for the construction of integration of transformative suspensions into additively manufactured structures which are expected to find particular utility in energy absorbing, energy dissipation and damping applications, and particularly in wearable energy absorbing systems.

BACKGROUND

This section provides background information related to the present disclosure which is not necessarily prior art.

There is increasing interest in the use of transformative fluids for a wide range of applications. A transformative liquid consists of particles suspended in a liquid medium. When an external force or electromagnetic field comes into contact with the liquid, its mechanical properties change. The use of transformative fluid for energy absorption and dissipation has been employed in the automotive industry for adaptive vehicle suspensions. However, the beneficial properties of transformative fluids have not been fully exploited in other energy absorbing needs because of the lack of means to encapsulate such a fluid in differing geometries, and particularly in three dimensional (3D) geometries. The ability to capture transformative fluids in a wide variety of components having widely differing 3D geometries would open the use of transformative fluids to a wide range of applications heretofore not possible in traditional manufacturing processes.

Specific work in this technology area is disclosed in the following documents: Deshmukh, S. S., & McKinley, G. H. (2006), *Adaptive energy-absorbing materials using field-responsive fluid-impregnated cellular solids. Smart Materials and Structures,* 16(1), 106-113. http://doi.org/10.1088/0964-1726/16/1/013; Lorang, D. J., Tanaka, D., Spadaccini, C. M., Rose, K. A., Cherepy, N. J., & Lewis, J. A. (2011), *Photocurable Liquid Core-Fugitive Shell Printing of Optical Waveguides,* Advanced Materials, 23(43), 5055-5058. http://doi.org/10.1002/adma.201102411; Leonowicz, M. & Kozlowska, J. (2014). Rheological Fluids as a Potential Component of Textile Products. Fibres Textiles in Eastern Europe, 1(103), 28-33; Krueger, H., Vaezi, M., & Yang, S. (2014), *3D Printing of Magnetorheological Elastomers (MREs) Smart Materials* (pp. 213-218), Presented at the 1st International Conference on Progress in Additive Manufacturing, Singapore, Research Publishing Services. http://doi.org/10.3850/978-981-09-0446-3_088; Deshmukh, et al., *Smart Mater. Struct.* (2006) describes an adaptive energy absorbing material by soaking a sponge with magnetorheological (MR) fluid; Lorang, et al., *Adv. Mater* (2011) describes using a concentric nozzle to additively manufacture two materials simultaneously; Leonowicz, et al., *FTEE* (2014) describes how MR fluid could be integrated into protective textiles by placing bags of the fluid behind Kevlar, and how MR fluid can increase the bullet resistivity of Kevlar when placed behind it; Leonowicz, et al., *FTEE* (2014) describes integrating sheer thickening fluid (STF) into Kevlar by soaking the Kevlar in the STF, and shows that the bullet resistivity of Kevlar increased when soaked with STF, and that sharp objects had a harder time piercing Kevlar when soaked with STF; Krueger, et al., *Pro-AM* (2014) describes the use of a dual head 3D printer to print silicone and a dry powder. All of the foregoing documents are hereby incorporated by reference into the present disclosure.

SUMMARY

This section provides a general summary of the disclosure, and is not a comprehensive disclosure of its full scope or all of its features.

In one aspect the present disclosure relates to an energy absorbing three dimensional (3D) structure. The structure may comprise an outer shell formed from a shell material. The outer shell may have a void forming a core volume. A transformative feedstock is contained in the void. The transformative feedstock is contained in the void and encapsulated within the outer shell, and provides enhanced energy absorbing properties to the 3D structure.

In another aspect the present disclosure relates to an energy absorbing three dimensional (3D) structure. The structure may comprise an outer shell formed from a shell material. The outer shell may have a void forming a core volume. A transformative liquid feedstock may be contained in the void. The transformative liquid feedstock may include at least one of a shear thickening liquid feedstock, a shear thinning liquid feedstock, a magnetorheological liquid feedstock, a ferrofluid liquid feedstock or a photocurable liquid feedstock. The transformative feedstock is encapsulated within the outer shell and provides enhanced energy absorbing properties to the 3D structure.

In still another aspect the present disclosure relates to an energy absorbing three dimensional (3D) structure. The structure may comprise an outer shell formed from a shell material, with the outer shell having a void forming a core volume. A transformative feedstock may be contained in the void. The transformative feedstock is encapsulated within the outer shell and the outer shell is temperature responsive, and provides energy absorbing properties that differ depending on a temperature that the structure experiences.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2A is an illustration of two materials being printed simultaneously using a dual flow nozzle assembly, such that a transformative fluid is captured within an internal core volume of the resulting component, and the transformative fluid is enclosed within an outer shell of the resulting component;

FIG. 2B is a perspective view of a bottom portion of the dual flow nozzle;

Figure 3:
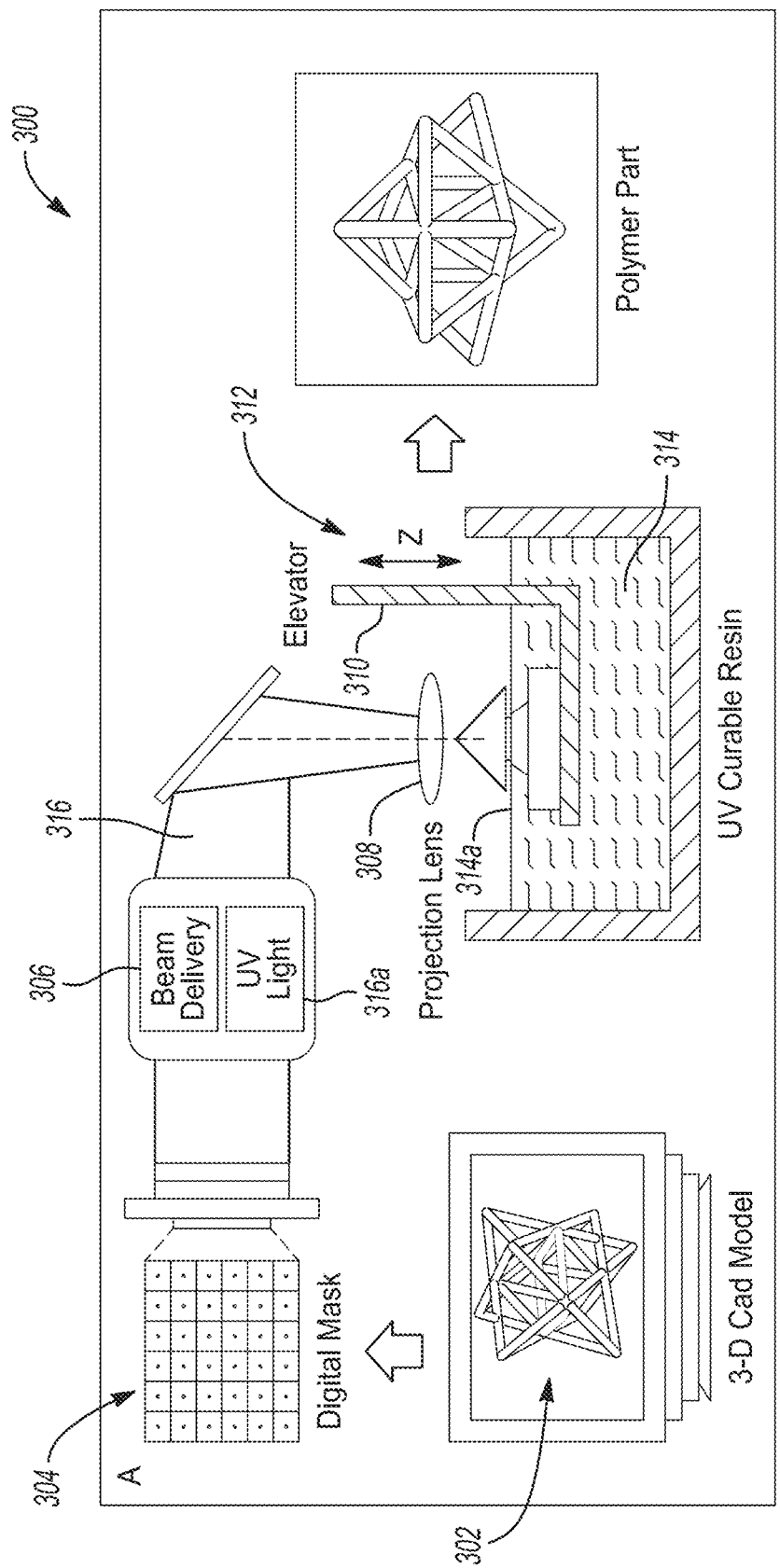
Figure 4:
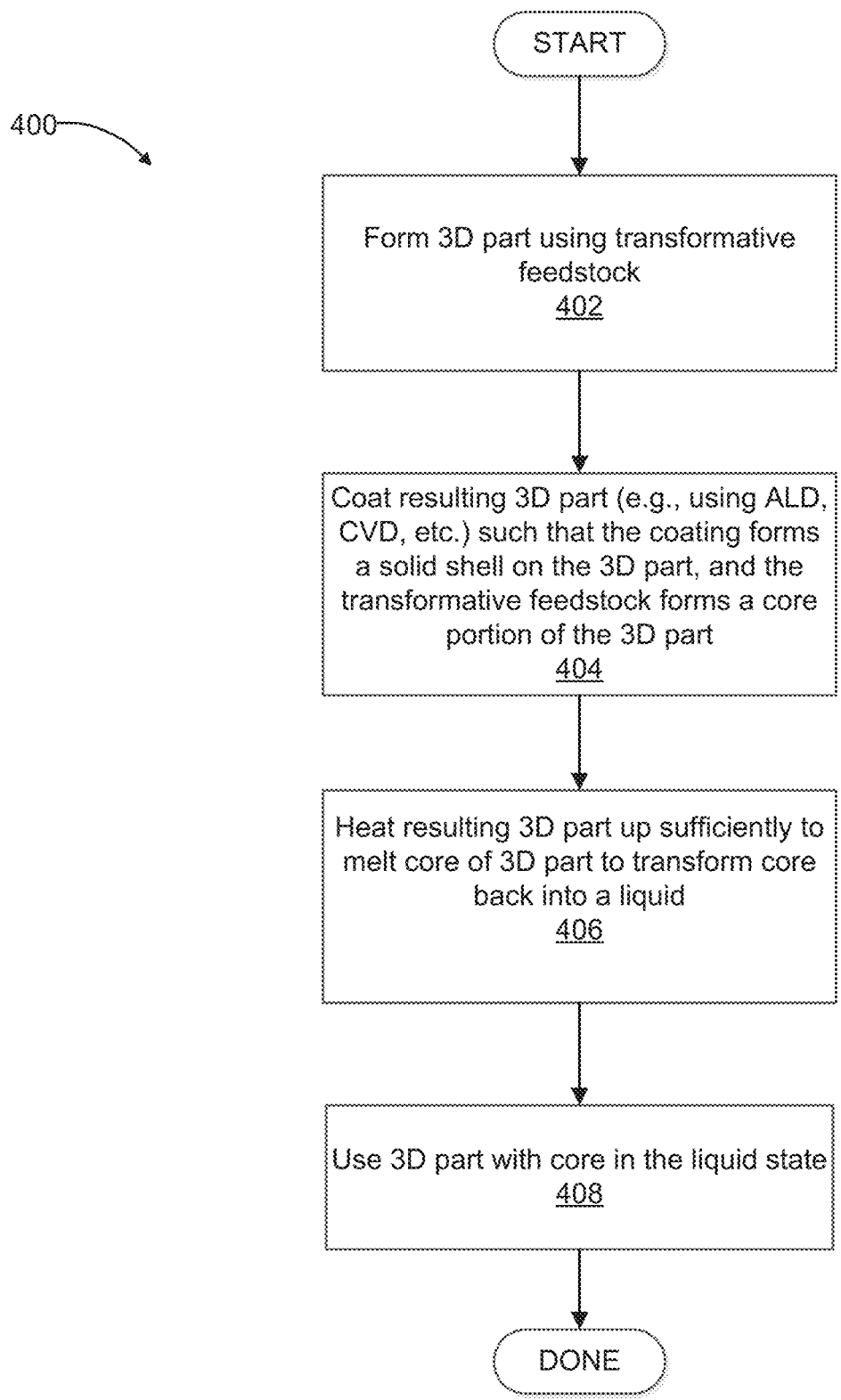

FIG. 3 is a diagram illustrating operations of a projection microstereolithography process for creating a polymer 3D part or structure having an outer shell with a core which is filled with a transformative liquid; and FIG. 4 is flowchart illustrating a plurality of operations that may be performed to construct a 3D structure having a transformative core material, which forms a core portion of the 3D structure, which is coated with a coating that forms a solid shell for the 3D structure, and where the core is capable of being transformed back into a liquid upon the application of sufficient heat to the 3D structure.

Corresponding reference numerals indicate corresponding parts throughout the several views of the drawings.

DETAILED DESCRIPTION

Example embodiments will now be described more fully with reference to the accompanying drawings.

The present disclosure relates broadly to using additive manufacturing and other processes to encapsulate a transformative liquid into a structure, part or component having a three dimensional (3D) geometry. In this regard, it will be appreciated that the term "transformative liquid" encompasses any form of flowable transformative fluid or composition that consists of particles suspended in a liquid or fluid-like medium, and whose mechanical properties change under the presence of a specific condition (e.g., a force or field acting on the liquid or fluid-like medium). This enables the transformative liquid to be patterned into numerous 3D geometries which is expected to further enhance the liquid's mechanical response or enable the transformative liquid to be utilized for applications requiring lightweight or flexible, adaptive energy absorption systems and/or components of such systems. The present disclosure describes four different techniques for integrating a transformative liquid into a structure having a 3D geometry.

Figure 1:
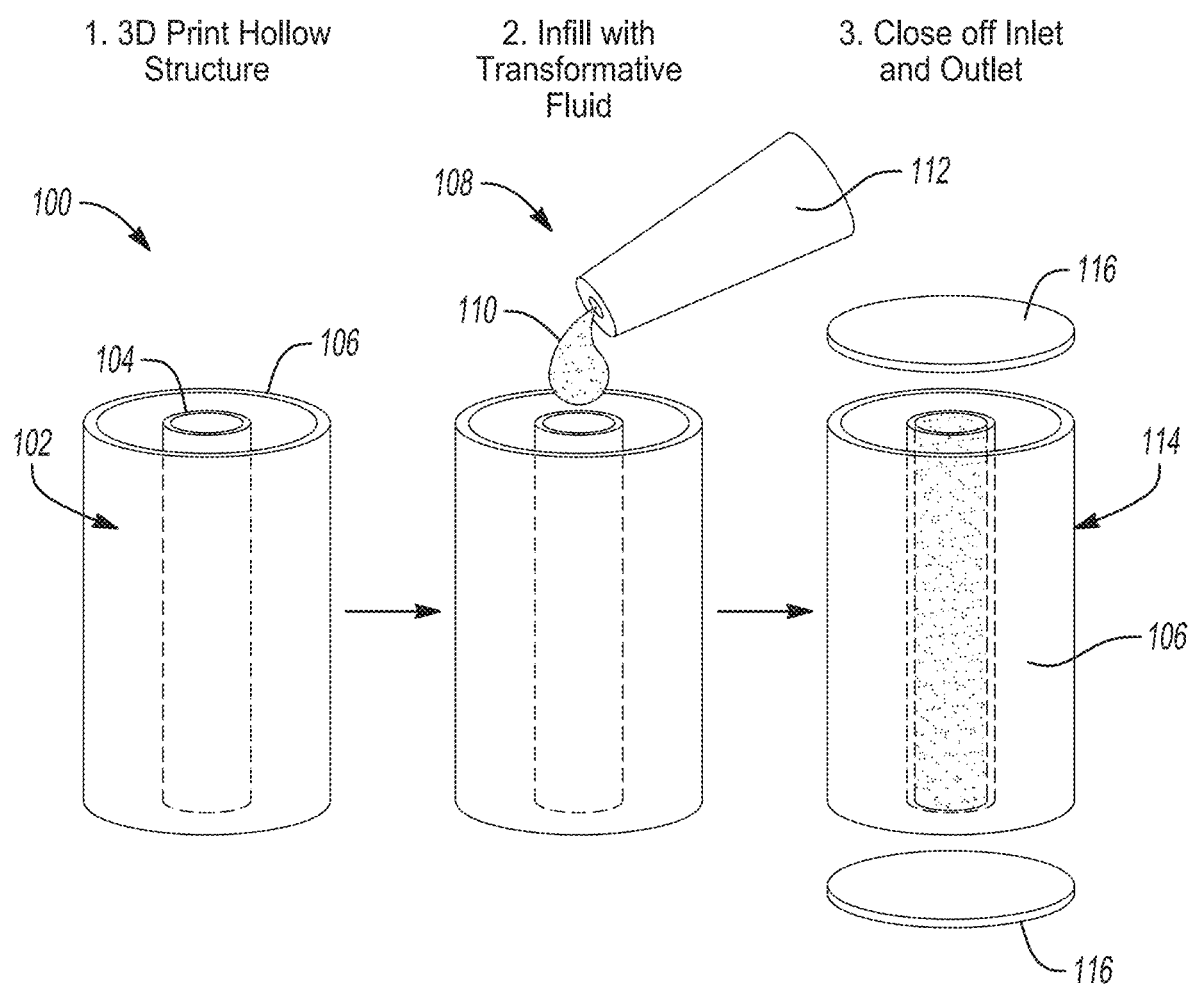
FIG. 1 is a high level drawing of a plurality of operations that may be performed to produce a 3D printed, at least partially hollow structure that includes a transformative fluid within an internal void.

Referring to FIG. 1, a first process 100 is shown for creating a 3D printed structure having a transformative liquid core. Initially a 3D structure 102 is created using a selected feedstock in a conventional additive manufacturing process. The feedstock may be selected from powdered metals, powdered plastics, silicones, acrylates or epoxies, just to name a few suitable materials commonly used in additive manufacturing processes. The structure 102 essentially forms what may be viewed as an outer shell. The structure 102 includes a void 104 that defines a volume within the structure. In this example, the void 104 takes the shape of a cylindrical void which is surrounded by a first material portion 106 making up the structure 102 (i.e., the outer shell of the 3D printed structure). The void 104 may range in diameter anywhere from microns to centimeters to suit the needs of a specific application, and may range significantly in volume as well.

The first material portion 106 consists of the selected feedstock. The void 104 may be open at one or both ends. At least one opening should be maintained to allow air to escape when a subsequent operation of filling the void 104 with a transformative liquid is performed. The opening may be positioned at any location that permits filling the void 104 without leakage, but in many instances it is expected that the opening will most conveniently located near an upper end of the void where it can be easily closed off after the filling operation is completed. And while the structure 102 and the void 104 are shown as having cylindrical shapes, this is merely one example of the shape that the structure 102 may take, and the process 100 is not limited to forming components or structures having any particular shape or geometry. The only requirement is that the structure 102 be capable of being manufactured with an internal void which can contain a transformative liquid.

At operation 108 the structure 102, which is now a solid formed component, has its void 104 filled with a transformative liquid 110 using a desired infill process. The infill process may involve an automated process or a mechanical injection process (e.g., using a syringe). The infill process may also involve a wicking process, a vacuum process, or any other suitable means for filling the void 104. In FIG. 1 an injection process is illustrated using a suitably shaped and dimensioned nozzle 112. At operation 114 further additive manufacturing operations may be used to form one or a pair of cover portions 116 to completely close the void 104. Once the void 104 is closed, the transformative fluid 110 is permanently contained within the structure 102 and forms a core portion of the structure. The transformative liquid 110 used may be a shear thickening fluid, a shear thinning fluid, a magnetorheological fluid, a ferrofluid or any other fluid-like adaptive material. Referring to FIG. 2A a process of using an in-situ infilling technique to form a 3D structure with an internal transformative fluid during an additive manufacturing process. FIG. 2A shows a nozzle 202 of an additive manufacturing system which simultaneously, or substantially simultaneously, deposits two materials to form a 3D structure having an outer layer 204 and a core 206. The core 206 may be a transformative fluid. Depending on the geometry of the structure being formed, the depositing of core 206 material and the outer layer 204 material may be performed simultaneously, or it may be required to build up several layers of outer layer 204 material before applying a quantity of core material. In the latter instance this would create somewhat of an alternating application of outer layer 204 and core 206 materials. In either event the core 206 material is completely encapsulated within the outer layer 204. As with the 3D structure formed by the method 100, the outer layer 204 essentially forms an outer shell for the 3D structure. In this example the core 206 material comprises a transformative liquid. The outer layer 204 may be comprised of any suitable material that forms an impermeable layer or shell, for example plastics, metals, silicones, acrylates or epoxies, just to name a few suitable materials.

FIG. 2B shows a portion of the nozzle 202 used in the method of FIG. 2A. A first nozzle portion 208 is deposited coaxially, and in this example concentrically, with an outer nozzle portion 210. However, the first or inner nozzle portion 208 need not be disposed perfectly concentrically within the outer nozzle portion 210 but instead could be disposed in an eccentric orientation. Still further, more than one first or inner nozzle portion 208 could be included so that two or more different types of transformative fluids could be applied simultaneously, or substantially simultaneously, with the material being deposited by the outer nozzle portion 210. Still further, more than two outer nozzles, arranged coaxially relative to each other, could be used to apply two different types of shell material, or to possibly create two or more distinct voids or pockets within the formed shell structure, which could each be filled with the same or different types of transformative fluids from two or more inner nozzle portions 208. This would enable the finished structure to be provided with different energy absorbing characteristics at different locations of the structure or even at different depths of the structure in a designated volume.

Referring now to FIG. 3, a method 300 is shown in accordance with another aspect of the present disclosure is shown in which a 3D printed structure is produced by using a photocurable, transformative fluid as a feedstock. This method involves using a 3D printing process, for example microstereolithography or stereolithography, to infill a part with a transformative fluid core during the printing process. First a computer is used to analyze a 3D CAD model of a hollow or partially hollow structure and to "slice" the 3D CAD model into a plurality of 2D images, as indicated at operation 302. A digital mask is used at operation 304 to project an image to a beam delivery subsystem at operation 306. The beam delivery subsystem focuses the image using a projection lens 308 onto a build elevator 310 at operation 312. Each one of the 2D images is projected onto the build elevator 310 slightly under the upper surface 314a of a photocurable liquid bath 314, using a UV light source 316a, as indicated at operation 316. The photocurable transformative liquid within the photocurable liquid bath 314 turns to a solid where the image is projected and cured by UV light creating the image (e.g., those areas of the image that are not masked out by the digital mask at operation 304). Once a given layer of transformative fluid builds and is cured (i.e., formed), it is submerged further into the photocurable liquid bath 314. This infills any cavities of the cured (i.e., solid) layer of photocurable transformative liquid, with an uncured quantity of the photocurable transformative liquid. Each layer prints and is infilled in this layer-by-layer process. The finished structure is a solid 3D shell with a transformative fluid core. Again, it is also possible for a portion of the 3D structure to be formed using a first type of photocurable, transformative feedstock, while one or more additional portions of the same 3D structure are formed after changing the transformative feedstock to a different type of transformative feedstock. This could involve placing the elevator adjacent to a different bath or emptying the feedstock material from the bath and replacing it with a different photocurable, transformative feedstock before continuing with the printing process to construct a 3D structure (i.e., part or component) having one or more internal voids that contain a transformative fluid.

Referring to FIG. 4, another method 400 in accordance with the present disclosure is illustrated for creating a 3D structure having a temperature sensitive transformative liquid core. With the method 400, a solid 3D part is initially formed entirely by using a transformative liquid feedstock, as indicated at operation 402. This would refer to any transformative fluid that could be frozen from a liquid to solid or semi solid or melted from a solid or semi solid to a liquid including magnetorheological fluids, ferrofluids, shear thickening fluid, shear thinning fluids or any other transformative fluid that can be frozen or solid/semi-solid that can be melted to behave like a transformative fluid. At operation 404 the solid 3D part is then coated. The coating operation may be performed using an atomic layer deposition ("ALD") process, a chemical vapor deposition ("CVD") process, an electroless plating process, an electroplating process, or possibly even by a painting, spraying or dipping process, or even possibly by a combination of two or more of the above described processes. The coating forms a solid shell on the 3D part that fully encapsulates the transformative material of the 3D part. The coating material may be comprised of plastics, silicones, epoxies, metals, ceramics, latex or any other material that could be used in a coating process. At operation 406 the fully coated 3D part is then heated sufficiently to melt the transformative core material to turn it back into liquid form. The coating, which essentially has formed an impermeable shell for the 3D part, maintains the overall geometry of the 3D part, but with the transformative liquid core material now back in a liquid state, the 3D part may exhibit significantly enhanced energy absorbing qualities. Thus, it will be appreciated that with this method, the 3D part will need to be heated to transform the core material back into the liquid state, and thus to provide the 3D part with energy absorbing qualities. At operation 408 the 3D part is used with the transformative core material in its liquid state.

The method 400 described above provides the advantage that the coated 3D part will have two distinctly different states: one where little or no energy absorbing quality is present, and a second one (after being heated) where a significant energy absorbing quality is present. This may be important in applications where the energy absorbing quality of the 3D part is only required, or desired, under certain conditions. Still further, it is possible to construct a 3D part with more than two transformative materials, each having different energy absorbing characteristics, and each being responsive to different levels of heating, which are encapsulated within the outer coating (i.e., outer shell) layer. Such a configuration could provide areas in the 3D part of different energy absorbing characteristics in response to different levels of heating.

The methods described herein can be used to make 3D components, parts and structures having arbitrary and widely differing 3D geometries. The 3D parts and structures made using the teachings described herein lend themselves well to a wide variety of potential applications. Such applications may include wearable technology such as body armor, helmets and gloves. Additionally, the various embodiments could be placed into various components that humans come into contact with to damp undesirable vibration or to cushion impacts to hands and legs of individuals. Such components may be steering wheel covers, seat cushions, tool handles for motor or pneumatically driven tools that produce vibration, grips for handguns and rifles, shoes, floor mats of motor vehicles, exercise and gymnastic mats, treadmill mats used on treadmills, and various interior surfaces of aircraft and watercraft where vibration and/or impacts may be experienced by occupants.

Further applications of the 3D products manufactured in accordance with the methods described herein may include wearable protective sports equipment such as shin pads, knee pads, elbow pads, shoulder pads, hip pads, thigh pads, neck protectors, torso (i.e., rib) protective vests, etc. The various 3D structures capable of being produced by the methods described herein can form lightweight, yet flexible and highly energy absorbing structures and wearable devices. The ability to produce highly arbitrary and complex 3D structures through an additive manufacturing or like process further enables lightweight 3D structures to be formed which can provide an improved degree of breathability while still providing excellent impact and energy absorbing characteristics, making such structures ideally suited for physically demanding wear in work activities and sports activities.

The methods described herein also may potentially enable existing protective garments (e.g., body armor such as bulletproof vests) to be made lighter and less bulky, without sacrificing impact and energy absorbing protection to the wearer.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An energy absorbing three dimensional (3D) structure, comprising:
   a flowable transformative feedstock;
   an outer shell formed from a shell material as a solid formed component, the outer shell having a void forming a core volume, the core volume including an opening in communication with the void and suitable for enabling direct filling of the core volume with the flowable transformative feedstock during a filling operation, and thereafter containing the flowable transformative feedstock in direct contact with an inner surface of the outer shell when the filling operation is complete and the opening is closed, and further such that the void maintains a consistent shape during the filling operation; and
   wherein the flowable transformative feedstock is encapsulated within the outer shell and provides enhanced energy absorbing properties to the 3D structure.

2. The structure of claim 1, wherein the flowable transformative feedstock comprises a transformative liquid feedstock.

3. The structure of claim 1, wherein the flowable transformative feedstock comprises a transformative shear thickening liquid feedstock.

4. The structure of claim 1, wherein the flowable transformative feedstock comprises a transformative shear thinning fluid.

5. The structure of claim 1, wherein the flowable transformative feedstock comprises a transformative magneto-rheological fluid feedstock.

6. The structure of claim 1, wherein the flowable transformative feedstock comprises a ferrofluid feedstock.

7. The structure of claim 1, wherein the flowable transformative feedstock comprises a photocurable transformative liquid feedstock.

8. The structure of claim 1, wherein the outer shell comprises the same material as the flowable transformative feedstock contained in the void.

9. The structure of claim 8, wherein the same material comprises a photocurable transformative feedstock, and where the shell is comprised of photocured portions of the photocurable transformative feedstock, and the void is filled with an uncured quantity of the photocurable transformative feedstock.

10. The structure of claim 1, wherein the outer shell comprises a plurality of layers.

11. The structure of claim 1, wherein the opening in communication with the void is closed off using the same material used to form the shell.

12. The structure of claim 1, wherein the shell is formed using at least one of:
   a powdered metal;
   a powdered plastic;
   a silicone;
   an acrylate; and
   an epoxy.

13. The structure of claim 1, wherein the void comprises a cylindrical void.

14. The structure of claim 13, wherein the cylindrical void comprises a diameter of microns to centimeters.

15. The structure of claim 13, wherein the structure comprises different energy absorbing characteristics at one of:
   different locations of the structure; or
   different depths of structure.

16. The structure of claim 1, wherein the shell material is comprised of at least two different types of materials.

17. The structure of claim 1, wherein the void comprises first and second distinct voids.

18. The structure of claim 1, wherein the flowable transformative feedstock comprises first and second transformative feedstocks.

19. The structure of claim 1, wherein the flowable transformative feedstock is temperature responsive to provide first and second degrees of energy absorption qualities when the structure experiences first and second temperatures.

20. An energy absorbing three dimensional (3D) structure, comprising:
   a flowable transformative liquid feedstock;
   an outer shell formed from a shell material as a solid formed component, the outer shell having a void forming a core volume, wherein the void is formed from the shell material and has an opening, the opening configured to directly receive the flowable transformative liquid feedstock and enable filling of the void such that the void holds a quantity of the flowable transformative liquid feedstock in direct contact with an inner surface of the outer shell which forms the void, and further such that the void maintains a consistent shape during the filling with the flowable transformative liquid feedstock;
   the flowable transformative liquid feedstock including at least one of:
      a shear thickening liquid feedstock;
      a shear thinning liquid feedstock;
      a magnetorheological liquid feedstock;
      a ferrofluid liquid feedstock;
      a photocurable liquid feedstock; and
   wherein the flowable transformative liquid feedstock is encapsulated within the outer shell after the opening is closed and remains in direct contact with the inner surface of the outer shell after encapsulation, the outer shell is temperature responsive, and the flowable transformative liquid feedstock provides enhanced energy absorbing properties to the 3D structure.

21. The structure of claim 20, wherein the outer shell is formed from at least one of:
   a powdered metal;
   a powdered plastic;
   a silicone;
   an acrylate; and
   an epoxy.

22. An energy absorbing three dimensional (3D) structure, comprising:
   a flowable transformative feedstock;
   an outer shell formed from a shell material as a solid formed component, the outer shell having a void forming a core volume, and an opening for enabling direct filling of the void with the flowable transformative feedstock, and wherein the void is suitable to contain the flowable transformative feedstock during a filling operation in contact with an inner surface of the shell material, and wherein the void maintains a consistent shape during the filling operation; and
   wherein the flowable transformative feedstock is temperature responsive and provides energy absorbing properties that differ depending on a temperature that the 3D structure experiences.

* * * * *